Aug. 18, 1942.  C. C. CHANCE  2,293,590
FAN
Filed Sept. 23, 1940
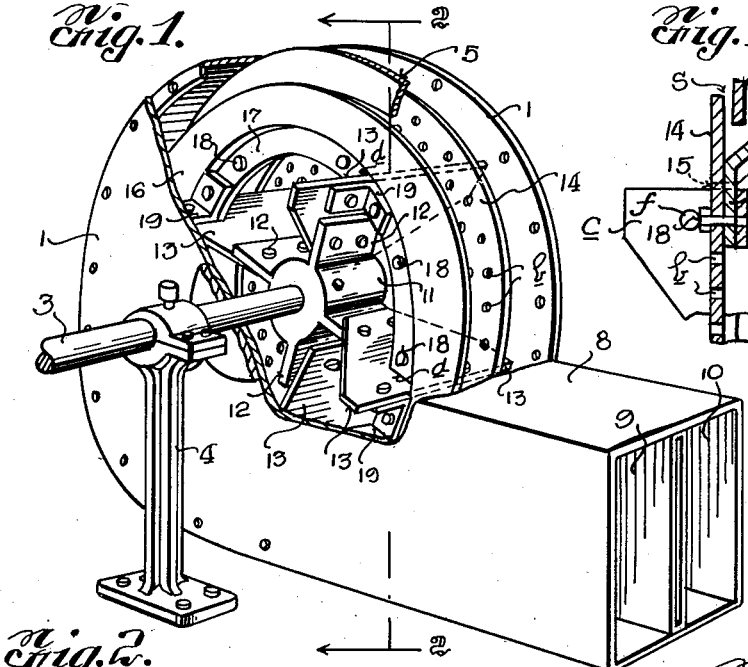
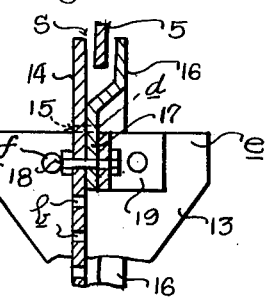
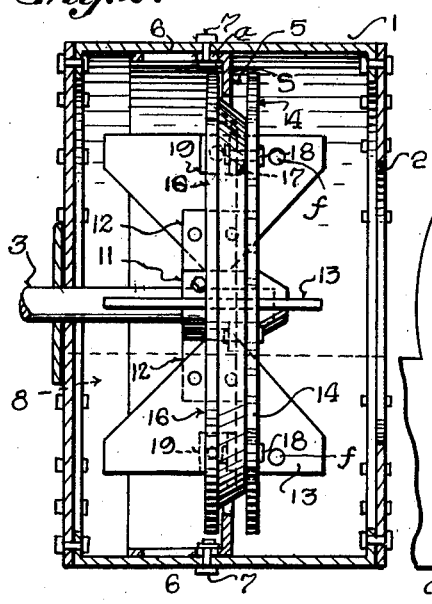
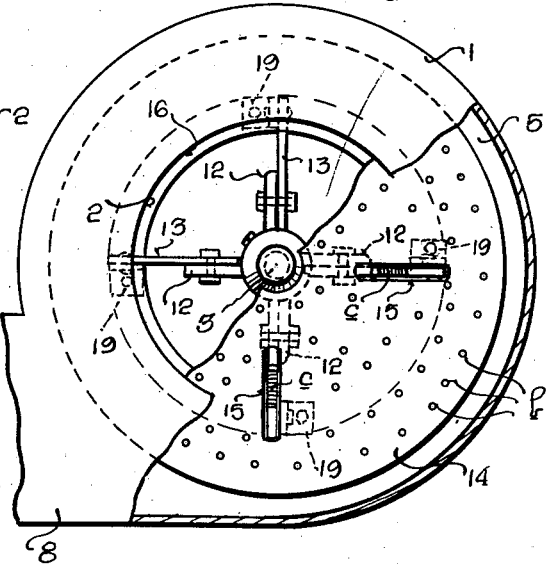
Christopher C. Chance
INVENTOR.
BY Patented Aug. 18, 1942

2,293,590

UNITED STATES PATENT OFFICE 2,293,590

FAN

Christopher C. Chance, Lubbock, Tex., assignor, by decree of court, of one-fourth to Cornelia Chance Application September 23, 1940, Serial No. 357,909

7 Claims. (Cl. 19—75)

This invention relates to fans and it has particular reference to fans adapted for the handling of cotton.

The principal object of the invention is to provide a fan which may be employed for unloading cotton from a conveyance and depositing the same in a gin house preparatory to ginning and has, among its outstanding features, the characteristic of removing from the cotton adhering particles of dirt or trash such as leaves, stems or the like, as the cotton passes through the fan housing, thereby minimizing the amount of time and effort usually expended in preparing seed cotton for the ginning operation.

Another object of the invention resides in its ability to move seed cotton rapidly and in great quantities yet without injury to the seed or lint.

Another object of the invention is to provide, first, for the separation of dirt from the cotton during its passage through the fan housing, without harsh treatment; second, to dispose of the extracted dirt and trash through a conduit separate from that through which the cotton is conveyed to a point of storage, final cleaning or ginning and supplants the conventional cotton dropper over the cleaners and further breaks up the bulk cotton for more expeditious distribution; and third, to provide for adjustment of the rotary elements, including the fan proper relative to the inlet of the fan housing, which latter may be accomplished without removing the scroll or outer flange of the fan housing.

With the foregoing objects as paramount, the invention has further references to other and lesser objects as well as to certain salient features and construction of parts which will become manifest as the description proceeds, taken in connection with the accompanying drawing, wherein:

Figure 1 is a perspective view with portions broken away, showing the invention.

Figure 2 is a vertical section on line 2—2 on Figure 1.

Figure 3 is an elevational view of the intake side of the fan with parts broken away, and Figure 4 is a fragmentary detail view of a fan blade, showing its relationship with the foraminous separating disc and blade retaining ring.

Continuing with a more detailed description of the drawing, reference is primarily made to Figure 1, which is taken on the side of the fan housing 1 opposite the intake opening 2 (shown in Figure 2). A shaft 3 enters the fan housing from one side and is supported by one or more standards 4 in order that one end thereof may terminate short of the intake opening 2, within the housing.

Disposed centrally in the housing 1 is a partitioning flange or splitter wall 5, whose function is to prevent reassociation of dirt with the cotton after separation, in a manner to become apparent presently. This separating wall 5 is adjustable laterally in the housing 1 by virtue of the flange 6, slotted at $a$ (Figure 2) through which bolts 7 are passed to hold said partition in place after adjustment thereof.

The stationary partition 5, which, in fact, is a ring or simply a flange, coincides with the central divisional wall of the exhaust conduit 8 to insure continued separation of dirt and cotton after such separation, the dirt being expelled through the portion 9 of conduit 8 while the cotton is expelled through portion 10 thereof (Figure 1).

Mounted on the shaft 3 within the housing 1 is the fan, comprised of the hub or spider 11, having radial arms 12 of any desired number. To these arms are affixed flat, substantially flared blades 13. It is apparent, however, that the invention is not limited to any specific type or form of fan blade.

In the construction of fans designed for a purpose similar to that for which the present fan has been designed, perforated plates have been employed and disposed intermediate the fan and intake opening but such plates are secured directly to the fan and may be regarded as a part thereof. The present invention, while including a foraminous disc or perforated plate 14, this plate is not only movable relative to the intake opening 2 but is likewise movable on the fan itself, that is to say, laterally with respect to the plane of rotation thereof.

The foraminous plate 14 is provided with radial slots 15, as well as apertures $b$ which latter are disposed throughout its entire surface area. The slots 15 receive the extended edges $c$ of the radial fan blades 13, as shown, so that the plate will rotate with the fan.

Associated with the plate 14 is a dust ring 16 which is disposed on the side of the partitioning flange 5 opposite the perforated plate 14 and having an offset flange 17, is connected by bolts or screws 18 to the perforated plate 14, and due to this offset flange 17, there is provided a space S in which the partitioning flange 5 reposes. The annular spaces between the plate 14 and ring 16 and the partitioning flange 5 provide for equal centrifugal discharge of air set in motion by the fan so that cotton or other material handled thereby will not tend to clog the space between the perforated plate and partition and that dirt passing through the perforated plate will find ready escape through the space between the ring 16 and partitioning flange, to be expelled through the corresponding conduit 9, while the cotton finds escape through the companion conduit 10.

The inner flange 17 of ring 16 is provided with slots d corresponding with the slots 15 of the perforated plate 14 to receive the opposite extended edges c of blades 13. The blades 13 are secured to the ring 16 by means of substantially L-shaped members 19.

When the structure described is employed as an unloading fan, that is, a fan for transferring cotton and the like from a wagon into storage, the fan and associated elements are disposed preferably as shown, with the edges of the blades of the fan extended through the slots 15 of plate 14. In any position of these parts, the suction of the fan is not materially changed but with the blade edges extended as shown, it is found that the material is moved out of the fan housing with greater velocity and can be thrown at greater distances.

As the cotton enters the intake opening 2, it impinges the plate 14 and due to the action of the blades 13, combined wtih the centrifugal force created by the rapid revolving perforated plate 14, the cotton is flung out through conduit 10 provided therefor.

The force by which the cotton impinges the plate 14, together with the suction through the apertures b of the plate causes extraction of clinging dirt from the cotton, which is influenced by suction to pass through the apertures to the opposite side of the partitioning flange and by which, aided by the ring 16, the dirt is kept from reentering the cotton chamber and is thrust out of the fan housing through portion 9 of the conduit 8 by action of the fan blades. Any dirt which might tend to accumulate in the annular space between the ring 16 and perforated plate 14 is kept from doing so by virtue of the centrifugal action set up by rotation of these elements.

When the fan is to be used as a gin fan; to convey cotton from the gin house and distribute the same among several cleaning units or gins, no dropper is required but a slight adjustment of the described parts will be necessary. In such a case, the fan, ring 16 and perforated plate 14 are moved nearer to the intake opening 2 but instead of the edges C of the fan blades extending through the slots 15 of plate 14, the plate is so adjusted as to lie flush with the extended edges of the blades. In the adjusted position, the members 19 supporting the ring 16 and plate 14 are moved so that their apertures will align with apertures f in the fan blades and the retaining bolts replaced. This adjustment requires that the position of the partitioning flange 5 be likewise changed relative to the scroll of the fan housing.

It has been stated that the fan suction remains substantially the same regardless of the relative positioning of the parts as explained. However, by so arranging the elements as to bring the fan blade edges flush with the plate 14, the force of discharge is not as great as otherwise and as a gin fan, is not needed. As usual, however, dirt extracted by the action of the fan is separately disposed of.

It is apparent from the foregoing that the fan as described may be adapted to many uses other than those set forth, such as moving cotton burs to the furnace for burning and wherein some of the indestructible material entering with the burs might prove injurious to the furnace. Removal of such material is accomplished ni the foregoing manner. Moreover, certain changes of degree and relationship of parts may be resorted to from time to time without departing from the spirit and intent of the invention as manifested in the appended claims.

What is claimed is:

1. A commodity handling fan comprising a housing having an inlet and a longitudinally divided outlet conduit, a partitioning flange adjustably disposed in said housing dividing the same, a driven shaft entering one side of said housing and terminating short of said intake, a fan mounted on said shaft whose blades are radially disposed in said housing, a foraminous plate interposed between the walls of said housing, a dust ring having a flange joined to the blades of said fan and connected to said foraminous plate to interpose said partitioning flange between said ring and plate whereby to segregate the commodity influx from foreign matter filtering through said foraminous plate and to separately discharge the same through said divided conduit.

2. A commodity handling fan comprising a housing having an intake and discharge, a shaft entering said housing and terminating short of said intake, a fan carried thereby, a separator flange in said housing and in said discharge, a foraminous plate adjustable relative to the blades of said fan and against which commodity is propelled by the action of said fan whereby to extract by force of impact and suction, foreign matter entrained in said commodity, and means secured to said plate to hold said foreign matter against reassociation with said commodity for discharge by said fan in a separate stream from said commodity.

3. A commodity handling fan comprising a fan housing and fan, a longitudinally divided intake and an exhaust for said housing, a partitioning flange centrally located in said housing to divide the same into separate zones, a screen in one of said zones against which commodity is forcibly drawn by the action of said fan, means connecting said screen to the blades of said fan to vary the area thereof exposed to said commodity and to accordingly vary the force of the discharge thereof on said commodity and means also adjustably mounted on said fan blades and secured to said screen opposite said partitioning flange for holding foreign matter extracted from said commodity by force of impact against said screen and by suction against reassociation with said commodity whereby the said foreign matter will be expelled by said fan in a stream separate from said commodity.

4. In a cotton handling and extractor fan, a housing therefor having an intake and discharge, means dividing said housing and discharge for separate expulsion of cotton and foreign matter extracted therefrom, foraminous means against which said cotton is forcibly impinged by suction created by said fan and through which foreign matter entrained therein will pass and an annular ring connected to said foraminous means and disposed on the side of said housing dividing means opposite said foraminous means to constrain the separated foreign matter to be discharged by said fan through a course separate from that through which said cotton is discharged.

5. In a fan for moving bulk cotton, a housing therefor having an intake and a discharge opening, partitioning means in said housing and discharge opening to effect separate discharge of cotton and extracted dirt, foraminous means against which cotton is forcibly drawn by the action of said fan to separate said cotton from said fan and through which entrained dirt is drawn, dust retaining means comprising an annular ring connected to said fan and foraminous means for maintaining separated condition of said dirt and cotton, said housing partitioning means being interposed between said ring and foraminous means and cooperating therewith for insuring separate discharge of said dirt and cotton from said housing by the action of said fan.

6. A structure as set forth in claim 5 in which the fan, the partitioning means, foraminous means and the dust retaining means are adjustable axially in the fan housing to effect a change in the force of discharge of said fan.

7. In a cotton handling and extractor fan, a housing therefor having an intake and discharge, means dividing said housing and discharge for separate expulsion of cotton and foreign matter extracted therefrom, foraminous means connected to the blades of said fan, against which said cotton is forcibly impinged by suction created by said fan and through which foreign matter entrained therein will pass, an annular ring connected to said foraminous means and offset to lie on the side of said housing opposite said foraminous means to constrain the separated foreign matter to be discharged by said fan through a course separate from that through which said cotton is discharged and means to effect lateral adjustment of said foraminous means relative to said fan to vary the area of the blades thereof exposed to the cotton entering said housing.

CHRISTOPHER C. CHANCE.